United States Patent
Frank et al.

(10) Patent No.: US 10,367,788 B2
(45) Date of Patent: *Jul. 30, 2019

(54) PASSPORT-CONTROLLED FIREWALL

(71) Applicant: International Business Machines Corporation, Armonk, NY (US)

(72) Inventors: Joachim H. Frank, Tuebingen (DE); Holger Karn, Aidlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/001,376

(22) Filed: Jun. 6, 2018

(65) Prior Publication Data
US 2018/0288003 A1    Oct. 4, 2018

Related U.S. Application Data

(63) Continuation of application No. 15/854,055, filed on Dec. 26, 2017, now Pat. No. 10,069,798, which is a
(Continued)

(51) Int. Cl.
*H04L 29/06* (2006.01)
*H04L 9/32* (2006.01)
(Continued)

(52) U.S. Cl.
CPC ...... *H04L 63/0263* (2013.01); *G07C 9/00007* (2013.01); *H04L 9/006* (2013.01);
(Continued)

(58) Field of Classification Search
CPC ... H04L 63/0263; H04L 9/006; H04L 9/3268; H04L 63/0442; H04L 63/08;
(Continued)

(56) References Cited

U.S. PATENT DOCUMENTS 6,003,133 A    12/1999    Moughanni et al.
6,154,775 A    11/2000    Coss et al.
(Continued)

FOREIGN PATENT DOCUMENTS

CN    103763323    4/2014

OTHER PUBLICATIONS

Chen et al., Cross-Domain Privacy-Preserving Cooperative Firewall Optimization, IEEE/ACM Transactions on Networking, vol. 21, No. 3, Jun. 2013, pp. 857-868.
(Continued)

*Primary Examiner* — Shahriar Zarrineh
(74) *Attorney, Agent, or Firm* — Schmeiser, Olsen & Watts, LLP; Isaac Gooshaw

(57) ABSTRACT

A method and system for dynamically modifying rules in a firewall infrastructure. A signed passport, which includes a heart-beat time-out interval and a firewall rule, is received. A trigger signal is generated within the heart-beat time-out interval. The signed passport and the trigger signal are transmitted within the heart-beat time-out interval to a border control agent of a firewall in the firewall infrastructure. In response to receiving, from the border control agent, a continuous confirmation of the firewall rule within a time interval shorter than the heart-beat time-out interval, the firewall is modified according to the firewall rule. In response to determining that the trigger signal was not received by the border control agent within the heart-beat time-out interval, the firewall rule is reset.

17 Claims, 3 Drawing Sheets

Related U.S. Application Data continuation of application No. 14/821,942, filed on Aug. 10, 2015, now Pat. No. 9,900,285.

(51) Int. Cl.
  *G07C 9/00* (2006.01)
  *H04L 9/00* (2006.01)

(52) U.S. Cl.
  CPC ........ *H04L 9/3268* (2013.01); *H04L 63/0442* (2013.01); *H04L 63/08* (2013.01); *H04L 29/06578* (2013.01); *H04L 63/126* (2013.01); *H04L 2463/121* (2013.01)

(58) Field of Classification Search
  CPC ............. H04L 29/06578; H04L 63/126; H04L 2463/121; G07C 9/00007
  USPC .......................................................... 726/13
  See application file for complete search history.

(56) References Cited

U.S. PATENT DOCUMENTS

| | | | |
|---|---|---|---|
| 6,550,012 B1* | 4/2003 | Villa ................... | H04L 63/0218 713/168 |
| 6,917,980 B1 | 7/2005 | Gusler et al. | |
| 7,055,173 B1* | 5/2006 | Chaganty ............ | H04L 41/0654 726/11 |
| 7,631,351 B2* | 12/2009 | Erofeev ................ | H04L 63/029 709/225 |
| 8,353,021 B1 | 1/2013 | Satish et al. | |
| 8,365,287 B2* | 1/2013 | Yoo ......................... | G06F 21/55 709/223 |
| 8,418,240 B2 | 4/2013 | Wool | |
| 8,549,609 B2 | 10/2013 | Horman et al. | |
| 8,555,369 B2 | 10/2013 | Chirra et al. | |
| 9,900,285 B2 | 2/2018 | Frank et al. | |
| 2003/0079146 A1 | 4/2003 | Burstein | |
| 2003/0167410 A1 | 9/2003 | Rigstad et al. | |
| 2004/0059943 A1 | 3/2004 | Marquet et al. | |
| 2004/0109447 A1 | 6/2004 | Douglass et al. | |
| 2005/0005165 A1 | 1/2005 | Morgan et al. | |
| 2005/0149721 A1* | 7/2005 | Lu ...................... | H04L 63/0227 713/154 |
| 2005/0204402 A1 | 9/2005 | Turley et al. | |
| 2007/0150948 A1 | 6/2007 | De Spiegeleer | |
| 2007/0234428 A1 | 10/2007 | Rash | |
| 2008/0248879 A1 | 10/2008 | Smith | |
| 2010/0037311 A1 | 2/2010 | He et al. | |
| 2010/0162381 A1* | 6/2010 | Fried ................... | H04L 63/0227 726/13 |
| 2012/0240236 A1 | 9/2012 | Wyatt et al. | |
| 2012/0311693 A1 | 12/2012 | Horman et al. | |
| 2013/0061309 A1 | 3/2013 | Diaz-Cuellar et al. | |
| 2013/0081102 A1 | 3/2013 | Beauvais et al. | |
| 2013/0091538 A1 | 4/2013 | Chirra et al. | |
| 2013/0305394 A1* | 11/2013 | Nozue ..................... | G06F 21/57 726/30 |
| 2014/0066063 A1 | 3/2014 | Park | |
| 2014/0068698 A1 | 3/2014 | Burchfield et al. | |
| 2014/0068721 A1* | 3/2014 | Ong ....................... | H04L 63/107 726/4 |
| 2014/0101717 A1 | 4/2014 | Hajost | |
| 2014/0282830 A1* | 9/2014 | Davis, Jr. ............ | H04L 63/0227 726/1 |
| 2015/0033285 A1 | 1/2015 | Gao et al. | |
| 2015/0096008 A1 | 4/2015 | Short et al. | |
| 2015/0281178 A1* | 10/2015 | Raman ................. | H04L 63/0227 726/13 |
| 2015/0358290 A1 | 12/2015 | Jain et al. | |
| 2017/0048198 A1 | 2/2017 | Frank et al. | |
| 2018/0139182 A1 | 5/2018 | Frank et al. | |

OTHER PUBLICATIONS

Amjad Gawanmeh, Automatic Verification of Security Policies in Firewalls with Dynamic Rule Sequence, 2014 11th International Conference of Information Technology: New Generations, 978-1-4799-3187-3/14, 2014 IEEE, DOI 10.1109/ITNG.2014.29, pp. 279-284.
Office Action (dated Apr. 19, 2017) for U.S. Appl. No. 14/821,942, filed Aug. 10, 2015.
Amendment (dated Jul. 19, 2017) for U.S. Appl. No. 14/821,942, filed Aug. 10, 2015.
Notice of Allowance (dated Oct. 11, 2017) for U.S. Appl. No. 14/821,942, filed Aug. 10, 2015.
Notice of Allowance (dated Apr. 23, 2018) for U.S. Appl. No. 15/854,055, filed Dec. 26, 2017.
312 amendment (dated May 24, 2018) for U.S. Appl. No. 15/854,055, filed Dec. 26, 2017.

* cited by examiner

US 10,367,788 B2

PASSPORT-CONTROLLED FIREWALL

This application is a continuation application claiming priority to Ser. No. 15/854,055, filed Dec. 26, 2017, which is a continuation of Ser. No. 14/821,942, filed Aug. 10, 2015, U.S. Pat. No. 9,900,285, issued Feb. 20, 2018.

TECHNICAL FIELD

The present invention relates generally to a method, system, and computer program product for modifying firewall rules, and more specifically, for dynamically modifying rules in a firewall infrastructure.

BACKGROUND

In corporate IP (Internet protocol) networks, communication from, to, and between systems is typically controlled by firewalls. For security reasons, firewall rules are usually as strict as possible; i.e., communication is only allowed from certain ports on one machine to certain ports of another machine, using a defined protocol.

SUMMARY

The present invention provides a method, and associated computer system and computer program product, for dynamically modifying rules in a firewall infrastructure for an application code. One or more processors receive a unit of deployment at a requestor module on a server, where the unit of deployment comprises the application code and a signed passport, and where the passport comprises a firewall rule and a first application hash value. The one or more processors authenticate the received passport. The one or more processors hash the received application code, resulting in a second application hash value. The one or more processors validate that the received first application hash value and the second application hash value are equal. In response to the authenticating and the validating, the one or more processors: receive the passport by a border control agent of the firewall from the requestor module, modify a firewall in the firewall infrastructure according to the received firewall rule, and enable communication with the application code through the modified firewall.

DETAILED DESCRIPTION

Figure 1:
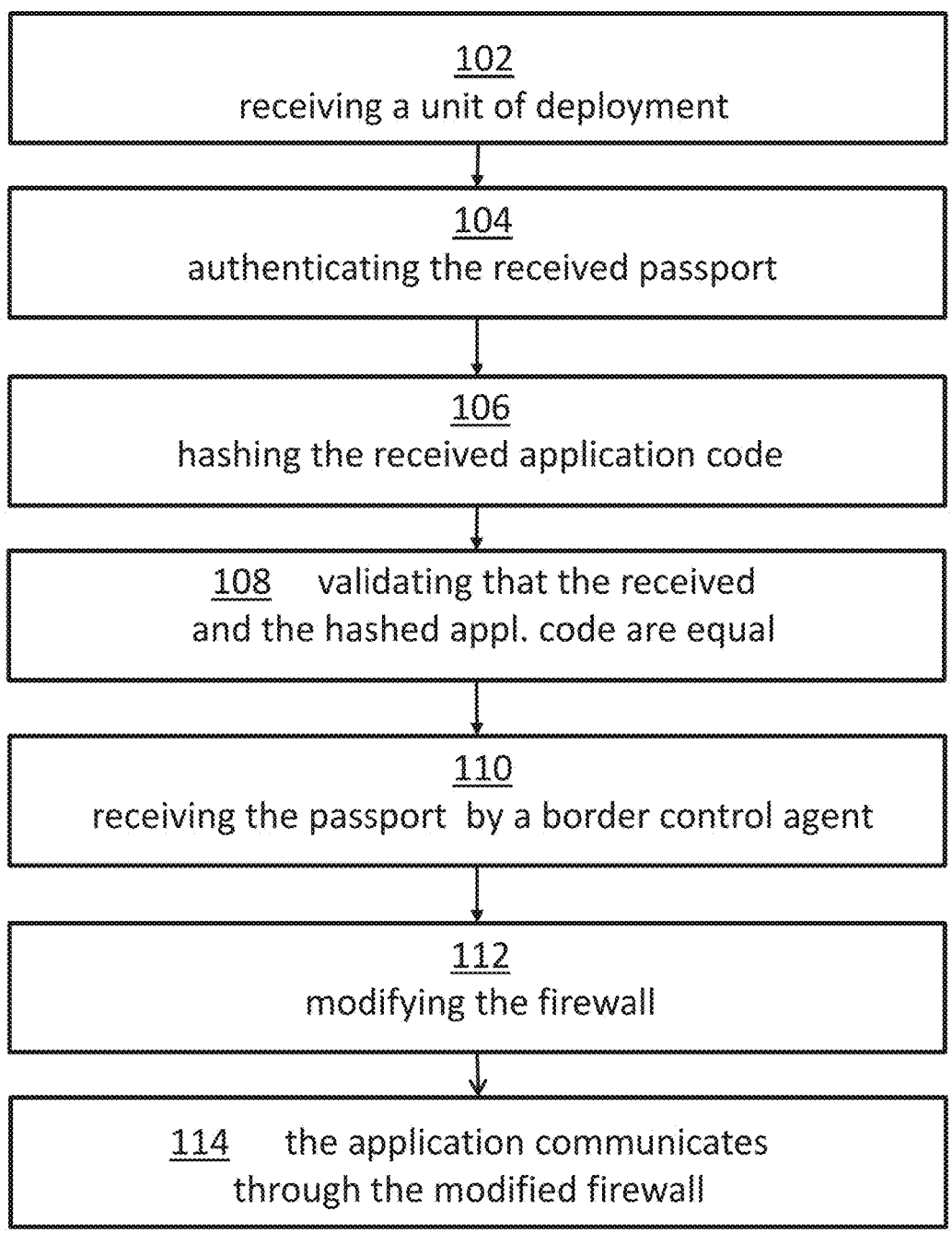
FIG. 1 depicts a flow chart of a computer-implemented method for dynamically modifying rules in a firewall infrastructure for an application code, in accordance with embodiments of the present invention.

Firewalls offer maximum security, but managing the firewalls have drawbacks.

Opening a firewall connection when a new application is deployed, which may be temporary; e.g., for testing purposes, requires human intervention to add a corresponding firewall rule. There are typically a limited number of people who are authorized to change firewall rules, and so requests for new firewall rules hinge on an availability of authorized people, causing cost and delays.

Resetting a firewall rule when an application is uninstalled, or when a test has been completed, becomes even more of a hazard because resetting the firewall rule may often be forgotten or postponed because of other priorities and if/when an administrator resets the firewall rule, the cost argument applies again.

These problems are much exacerbated in a Cloud computing environment. While traditional IT installations, servers and the IP addresses of the traditional IT installations servers tend to be stable over long periods of time, virtual servers in a Cloud computing environment can be added and removed in a matter of minutes, and IP addresses are reassigned frequently, which may cause an explosion of the requests for firewall updates.

Known solutions either require human intervention or lack trustworthiness of requested firewall changes.

It may be noted that the method component, and respective system activity, of "receiving a unit of deployment" may be implemented in several different ways. One way may be a direct receiving of the unit of deployment by the requestor module. An alternative way may be that the unit of deployment may be made available on the server; e.g., by file transfer, and that the requestor module may receive a trigger informing the requestor module about the availability of a new unit of deployment.

In the context of the description of the present invention, the following conventions, terms and/or expressions may be used.

The term 'requestor module' denotes a trusted module at a deployment target system or server. The requestor module may act as the applicant's or deployer's agent in enabling communication through the firewall in an automatic way. In one embodiment, the requestor module receives the passport from the deployer. In another embodiment, the requestor module requests a firewall change by communicating with a border control agent.

The term 'border control agent' denotes, in the same way as the requestor module, a trusted module. The border control agent may be configured to communicate in a secure way with the requestor module based on certificates and may also be configured to change, add, delete or reset firewall rules. The border control agent may also be denoted as "automated firewall manager".

The term 'firewall infrastructure' denotes a hardware and/or software-based network security system, including all necessary subsystems that may control incoming and outgoing network traffic based on an applied rule set. A firewall may establish a barrier between a trusted, secure internal network and another network, such as the Internet, that may not be secure and trusted. Firewalls exist both as software to run on general purpose hardware and as a hardware appliance. Many hardware-based firewall environments also offer other functionalities to the internal network that the firewall environments protect.

The term 'application code' denotes an executable form of an application source code. The application code may be executed as an application on a computer system, such as on a server in, e.g., a Cloud computing center.

The term 'unit of deployment' denotes a package which may be sent from a deployer to a server in a computing center. The server may also comprise or run the requestor module. The unit of deployment may comprise the application code itself as well as a passport.

The term 'passport' denotes a data package or a data structure comprising a hash value which has been generated using the application code as input, as well as the required firewall rules required for running the application. Additionally, the passport data structure may also comprise a heart-beat time-out interval value which may be instrumental for resetting the firewall if the heart-beat signal is not received by the border control agent from the requestor module.

The term 'firewall rule' denotes an application layer filtering applied by a firewall that can "understand" certain applications and protocols (such as File Transfer Protocol (FTP), Domain Name System (DNS), or Hypertext Transfer Protocol (HTTP)), which may be useful for detecting if an unwanted protocol is attempting to bypass the firewall on an allowed port, or detecting if a protocol is being abused in any harmful way. The next-generation firewall (NGFW) comprises a "widen" or "deepen" inspection at the application-stack level. For example, the existing deep packet inspection functionality of modern firewalls can be extended to include i) an Intrusion Prevention Systems (IPS); ii) a user identity integration (by binding user IDs to IP or MAC addresses for "reputation"); and/or iii) a Web Application Firewall (WAF).

The term 'first application hash value' may denote a hash value, of a first application, that may be generated using a hash function, in particular a hash function executed by the deployer on the deployer side. The used hash function may be the same as applied on the server-side.

The term 'heart-beat time-out interval' denotes a numerical value defining a time interval in which a trigger signal must be generated to keep the changed firewall rules established or confirmed. If there is no trigger signal during a heart-beat time-out interval, the requested and implemented modifications to the firewall settings will be reset automatically.

The term 'trusted signer' denotes an authority signing certificates as is known in the art; e.g., a root Certificate Authority.

The computer-implemented method for dynamically modifying rules in a firewall infrastructure and the related system offer several advantages.

The solution provided by the present invention overcomes at least the above-mentioned limitations of traditional firewall management. The solution allows a time-limited firewall rule change request. The requests are managed on the server-side; e.g., in a Cloud computing environment by trusted components. The solution does not require a human operator for changing the firewall rules, while at the same time ensuring that only authorized personnel, such as a deployer, may request a firewall rule change. The solution ensures that a firewall rule change may not be unlimitedly valid. A time interval may be definable together with a request for a firewall rule change. Additionally, the solution ensures that only a trusted application code may be executed and may communicate through newly opened ports of the firewall according to the modified firewall rules. It is not required that the server running the application code and the firewall are executed or be part of the same physical or virtual system. Communications between involved components is implemented in a secured manner.

According to one embodiment of the computer-implemented method, the passport also comprises a heart-beat time-out interval. The heart-beat time-out interval may be used to validate that the requested firewall rule change may still be needed by the application code on the server. The developer or deployer may have terminated usage (e.g., testing) of the application code, after which it would be instrumental for security reasons to reset the firewall rule automatically to the firewall rule's original status.

Therefore, and according to one embodiment, the computer-implemented method may also comprise confirming on a regular basis, within each of the heart-beat time-out intervals, the firewall rule by a requestor module of the server to a border control agent of the firewall. The validation and reconfirmation of the firewall rule, if not signaled to the border control agent, may reset the firewall rule again.

Thus, according to an embodiment, the computer-implemented method may also comprise that, in response to a determination that no confirmation was received by the border control agent within the heart-beat time-out interval, the firewall rule in the firewall may be reset.

According to an additional embodiment of the computer-implemented method, a first hash function, in particular on the deployer side, may be used to generate the first application hash value and a second hash function, and in particular on the server side, may be used to generate the second application hash value. The method may comprise a comparison/determination that the results of both hash functions are equal, which ensures that the application code has not been modified during the application code's transmission from a deployer to the server.

According to an embodiment of the computer-implemented method, an encryption may be used for encrypting the passport, which may be based on an asymmetric encryption method using the known public key of the requestor module for encryption, and the requestor module's private key for decryption. Besides making sure that the passport originates from the deployer (i.e., using a signature for the passport), the content of the passport may also be secured by encryption. Hence, the passport may have to be decrypted before its content is used.

According to a further embodiment of the computer-implemented method, a secure communication channel may be established between the requestor module of the server and the border control agent of the firewall. Typically, at least one separate server may be used for implementing the firewall functions in addition to one or more servers for running the application code of one or a plurality of applications.

According to an embodiment of the computer-implemented method, an encryption of the passport is based on a public key certificate registered with a trusted signer, which may enhance the trustworthiness of the proposed solution.

It may be noted that the inventive subject-matter may be implemented in a Cloud computing environment implementing Cloud computing services. Such a Cloud computing service belongs to Cloud computing in general, which is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and comprises characteristics, service models, and deployment models.

Characteristics of Cloud Computing Comprise:

(i) On-demand self-service. A consumer can unilaterally provision computing capabilities, such as server time and network storage, as needed automatically without requiring human interaction with each service provider.

(ii) Broad network access. Capabilities are available over the network and accessed through standard mechanisms that promote use by heterogeneous thin or thick client platforms (e.g., mobile phones, laptops, and PDAs).

(iii) Resource pooling. The provider's computing resources are pooled to serve multiple consumers using a multi-tenant model with different physical and virtual resources, dynamically assigned and reassigned according to consumer demand. There is a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

(iv) Rapid elasticity. Capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

(v) Measured Service. Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both the provider and consumer of the utilized service.

Service Models for Cloud Computing Comprise:

(i) Cloud Software as a Service (SaaS). The consumer is enabled to use the provider's applications running on a Cloud infrastructure. The applications are accessible from various client devices through a thin client interface such as a web browser (e.g., web-based e-mail). The consumer does not manage or control the underlying Cloud infrastructure including network, servers, operating systems, storage, or even individual application capabilities, with an exception of limited user-specific application configuration settings.

(ii) Cloud Platform as a Service (PaaS). The consumer is enabled to deploy, onto the Cloud infrastructure, consumer-created or acquired applications created using programming languages and tools supported by the provider. The consumer does not manage or control the underlying Cloud infrastructure including network, servers, operating systems, or storage, but has control over the deployed applications and applications hosting environment configurations.

(iii) Cloud Infrastructure as a Service (IaaS). The consumer is enabled to provision processing, storage, networks, and other fundamental computing resources where the consumer is able to deploy and run arbitrary software, which can include operating systems and applications. The consumer does not manage or control the underlying Cloud infrastructure, but has control over operating systems and storage, deployed applications, and has limited control of selected networking components (e.g., host firewalls).

Deployment Models for Cloud Computing Comprise:

(i) Private Cloud. The Cloud infrastructure is operated solely by an organization and may be managed by the organization or a third party and may exist on premise or off premise.

(ii) Community Cloud. The Cloud infrastructure is shared by several organizations and supports a specific community that has shared concerns (e.g., mission, security requirements, policy, and compliance considerations). The Cloud infrastructure may be managed by the organizations or a third party and may exist on premise or off premise.

(iii) Public Cloud. The Cloud infrastructure is made available to the general public or to a large industry group and is owned by an organization selling Cloud services.

(iv) Hybrid Cloud. The Cloud infrastructure is a composition of two or more Clouds (private, community, or public) that remain unique entities but are bound together by standardized or proprietary technology that enables data and application portability (e.g., Cloud bursting for load-balancing between Clouds).

It is noted that Cloud software takes full advantage of the Cloud paradigm by being service-oriented with a focus on statelessness, low coupling, modularity, and semantic interoperability.

FIG. 1 depicts a flow chart of a computer-implemented method 100 for dynamically modifying rules in a firewall infrastructure for an application code, in accordance with embodiments of the present invention. The method 100 comprises receiving, in step 102, a unit of deployment, in particular from a deployer, at a requestor module on a server. The unit of deployment comprises at least the application code; e.g., executable code or object code, and a signed passport. The signature originates from the sender, in this case from the deployer. The passport comprises at least one firewall rule and a first application hash value (i.e., hash value of the first application). The firewall rule may be a combination of several firewall rules building a more complex rule. The first application hash value may be generated on the deployer side.

The method also comprises authenticating, in step 104, the received passport and hashing, in step 106, the received application code, in particular by the server side (e.g., by the requestor module), resulting in a second application hash value. The two hash values may be compared and it may be determined or validated, in step 108, that the two hash values are equal and if so, the underlying process of the method continues with: receiving, in step 110, the passport by a border control agent of the firewall from the server; modifying, in step 112, a firewall in the firewall infrastructure according to the received firewall rule; and communicating, in step 114, with the application code through the modified firewall comprising the modified rule.

Figure 2:
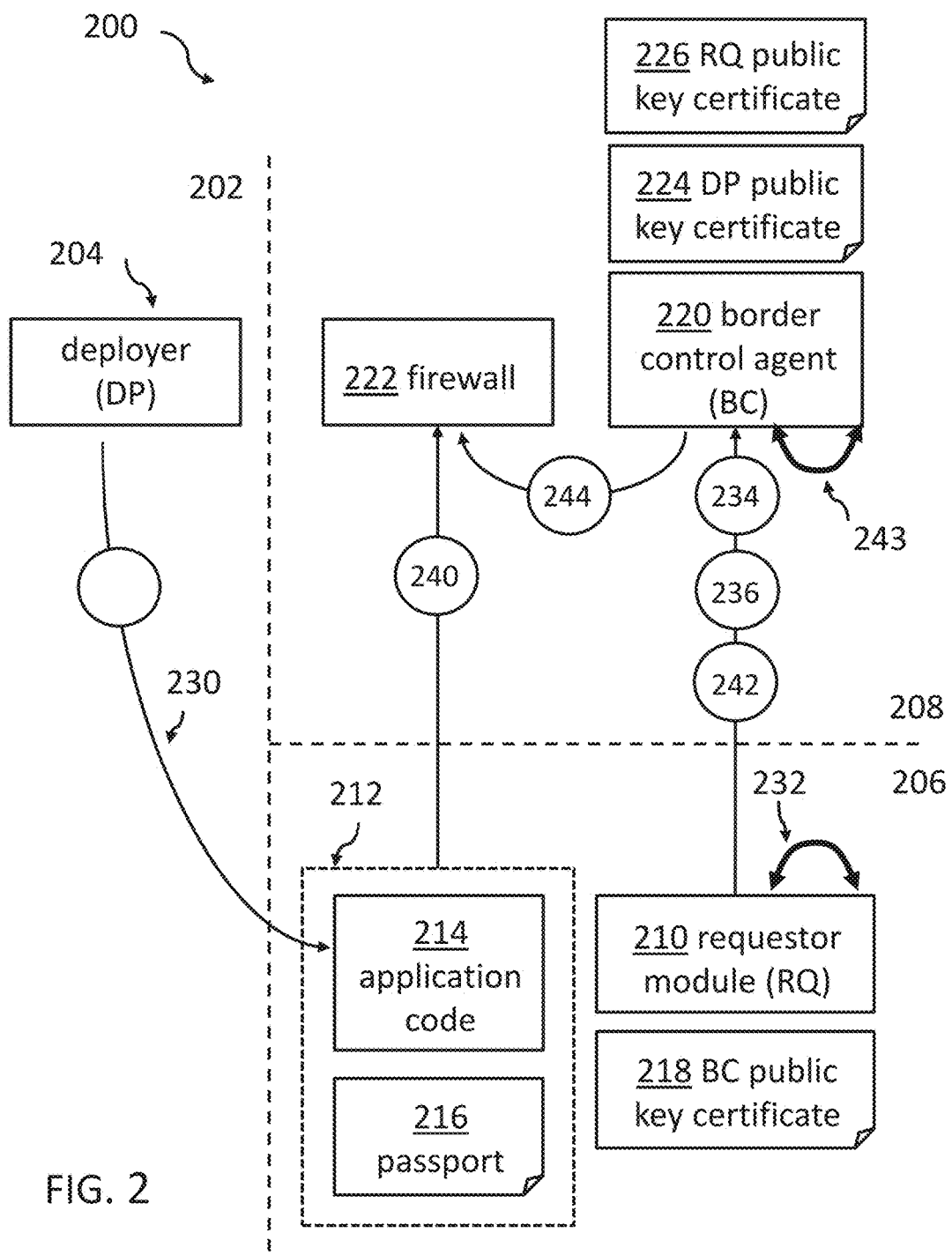
FIG. 2 depicts a block diagram of elements used by the method of FIG. 1, as well as related information flows, in accordance with embodiments of the present invention.

FIG. 2 depicts a block diagram 200 of elements used by the method of FIG. 1, as well as related information flows, in accordance with embodiments of the present invention. FIG. 2 comprises three areas, namely area 202, area 206, and area 208.

The area 202 comprises a deployer system 204 (hereinafter, "deployer") which may be, inter alia, a computer system of a software developer developing application code 214. In the area 206, a server may be positioned to run the application code 214. The server may also run or comprise a requestor module 210. The area 208 may represent the area of the firewall 222. The firewall 222 may be executed or may be part of the separate communication server which may also run or comprise the border control agent 220.

It may be noted that the computer systems in the areas 206 and 208 may belong to a Cloud computing center. The deployer system 204 may have remote access to the resources of the Cloud computing center.

In one embodiment, the user is authorized as a deployer 204 by registering a public key certificate 224 for the user's identity at a place where the requestor module 210 and the border control agent 220 can look up the public key certificate 224. The public key certificate 224 may be signed by a trusted signer, e.g., a root CA (root Certificate Authority). It may be noted that the authorized deployer 204 has public key certificate 224 published somewhere, e.g., on a publicly accessible server, a shared files system, a web-site, etc., so that the requestor module 210 and the border control agent 220 can look up the public key certificate 224. The process of publishing the deployer's public key certificate may be handled in a secure fashion and, in one embodiment, is a person process. However, this trusted person process may only happen once, and not every time, a firewall rule has to be changed, which represents an improvement over other known processes.

It may also be assumed that the border control agent 220 and the requestor module 210 have signed public-key certificates 218 and 226 and have access to the corresponding private keys of the public-key certificates 218 and 226 which are also signed by a trusted signer, and are available publicly.

As a first step 230, the deployer 204 sends application code 214 together with an electronic passport 216 as a unit of deployment 212 to a server in the area 206. The passport 216 comprises the requested firewall rules (representing a change in the firewall rules) and a hash value of the application code which may have been generated on the deployer 204 side. Additionally, a heart-beat time-out interval or time-out for a heart-beat signal may also be included in the passport 216. The firewall rule(s) is/are part of the application's deployment information and may originate from an application developer, from a company selling the application code 214, or may have been authored by the deployer 204. However, by signing the passport, the deployer 204 assumes responsibility for the firewall rules request. The deployer 204 may always be identifiable if it turns out that the changed firewall rules have caused a vulnerable security setting within the firewall 222.

As a follow-on step, an application code validation may be required. At some point in time before the application code 214 starts to communicate via the firewall 222 with the outside world, the requestor 210 will become active and interact with the border control agent 220 to have the necessary firewall rules applied. There are several ways in which the activation of the requestor 210 may happen: (a) through a hook when the application code 214 is deployed; (b) through a hook when the application code 214 is started; (c) through an explicit API call before the application code 214 begins to communicate; or (d) by intercepting the error that may result when the application code 214 first attempts to communicate through a closed firewall 222.

It may be noted that the last method does not require any changes to the application (whose source code may not be available) and will re-trigger the requestor if the firewall 222 was closed after a period of the inactivity.

After activation, the requestor 210 may identify the application binary or application code 214, hash the application code 214 and compare, in step 232, the result with the hash value, received with/in the passport, to ensure that the application code 214 was not tampered with and if so, the following steps will be carried out.

The requestor 210 and the border control agent 220 are trusted agents, in particular software agents, with known public keys 218 and 226. Both the requestor 210 and the border control agent 220 can use well-known methods, such as IKE (Internet Key Exchange), to mutually authenticate and establish a trusted communication channel between the requestor 210 and the border control agent 220, which establishes an authenticated, secure communication channel in step 234.

Using the secure communication channel established in step 234, the passport 216 may be transmitted, in step 236, from the requestor 210 to the border control agent 220. If building a secured communication channel between the requestor 210 and the border control agent 220 is impracticable, then the same level of security may also be achieved by the requestor 210 signing the passport 216, encrypting the signed passport with the border control agent's public key 218, and then transmitting the encrypted passport over/through a communication channel which may be unsafe.

Next, the border control agent 220 validates, in step 243, the deployer's passport signature, e.g., based on the deployer's public key certificate 226. At this point, the border control agent 220 knows that: (a) the firewall rules requested in the passport 216 are authorized by the deployer 204; (b) the firewall rules requested in the passport 216 are for an application deployment that is authorized by the deployer 204; and (c) the application code 214 has not been tampered with. In other words, as long as the deployer 204 and the requestor 210 can be trusted, the border control agent 220 knows that the firewall change requests are made by a "good" or trusted requestor 204 for an "authorized" deployment of a "safe" application. Thus, the border control agent 220 implements or applies, in step 244, the requested firewall changes.

Additionally, the border control agent 220 will log the passport 216 transmission, so that the entire request may be traced back to the deployer 204. If malicious activity is detected later, either originating from the application code 214, or by other software exploiting the firewall 220 modifications requested by the application code 214, a responsible user can be tracked down.

If the signature is valid and the deployer's public key certificate 224 is in the set of certificates of authorized deployers, the border control agent 220 applies the requested firewall rules to the firewall 220.

As a next step, the application using the application code 214 communicates, in step 240, via the firewall 222 which has by now the changed firewall settings or rules applied. Depending on how the requestor 210 was triggered, the application code 214 can communicate through the firewall 222 either immediately, or by retrying a communication that had failed (after a short delay), or the interceptor that caught the communications failure that triggered the requestor 210 can repeat the communications request.

In one embodiment of the invention, the requestor 210 may send heart-beat signals 242 to the border control agent 220. As long as the application code 214 has an open connection matching the previously opened firewall rule, the requestor 210 periodically sends a heart-beat signal 242 for the application code 214 to the border control agent 220 in time intervals that are shorter than the heart-beat time-out value time interval in the application code's passport 216. As long as the heart-beat signals are received within the agreed-upon time interval, the border control agent 220 will leave the firewall 222 open. When the application code 214 is stopped or undeployed, the requestor 210 will stop sending those heart-beat signals and the border control agent will close the firewall 222 rule relating to the application code 214 when the first heart-beat signal for the application code 214 is missed.

It may be noted that one way of helping the requestor 210 know the timeout status of the application code 214 is to include an application-specific "status sensor" script in the deployed package (not shown), which may encapsulate the logic to query the application code's status and respond with a true/false value indicating whether the application code 214 is running or not. The script may implement a standardized interface which the requestor 210 would invoke.

In case the application may be re-deployed or re-started, the steps 232, 234, 236, 243, 244, 240 will automatically be repeated and re-open an application specific firewall 222 port without any further human intervention.

Figure 3:
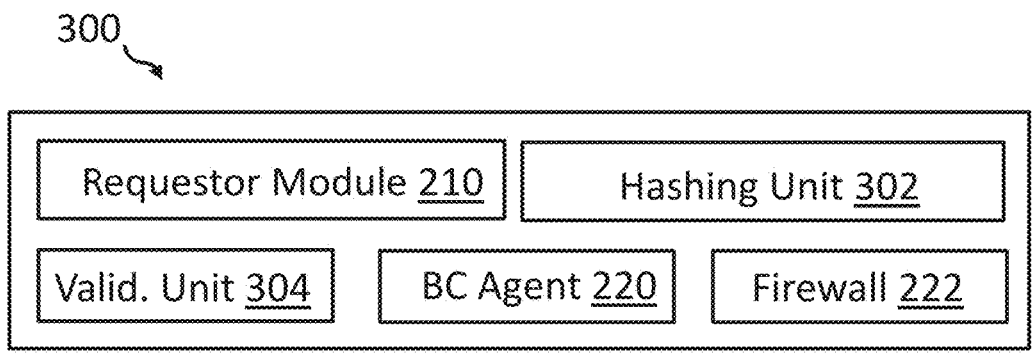
FIG. 3 depicts a block diagram of a system for dynamically modifying rules in a firewall infrastructure for an application code, in accordance with embodiments of the present invention.

FIG. 3 depicts a block diagram of a system 300 for dynamically modifying rules in a firewall infrastructure for an application code, in accordance with embodiments of the present invention. The system comprises at least a requestor module 210 of a server. The requestor module 210 is configured for receiving a unit of deployment 212 at a server. The unit of deployment 212 comprises the application code 214 and a signed passport 216. The passport 216 comprises at least one firewall rule and a first application hash value. The requestor module 210 is configured for an authentication of the received passport 216. A hashing unit 302 is configured for hashing the received application code 214, resulting in a second application hash value. A validation unit 304 is configured for validating that the received first application hash value and the second application hash value are equal. A border control agent 220 is configured for receiving the passport 216 from the requestor module 210 and is also configured for validating a passport signature. The border control agent 220 is also configured for modifying a firewall rule in a firewall 222 unit of the firewall infrastructure. The firewall 222 unit is configured for a communication 240 with/by the application code 214 through the modified firewall 222 unit.

Figure 4:
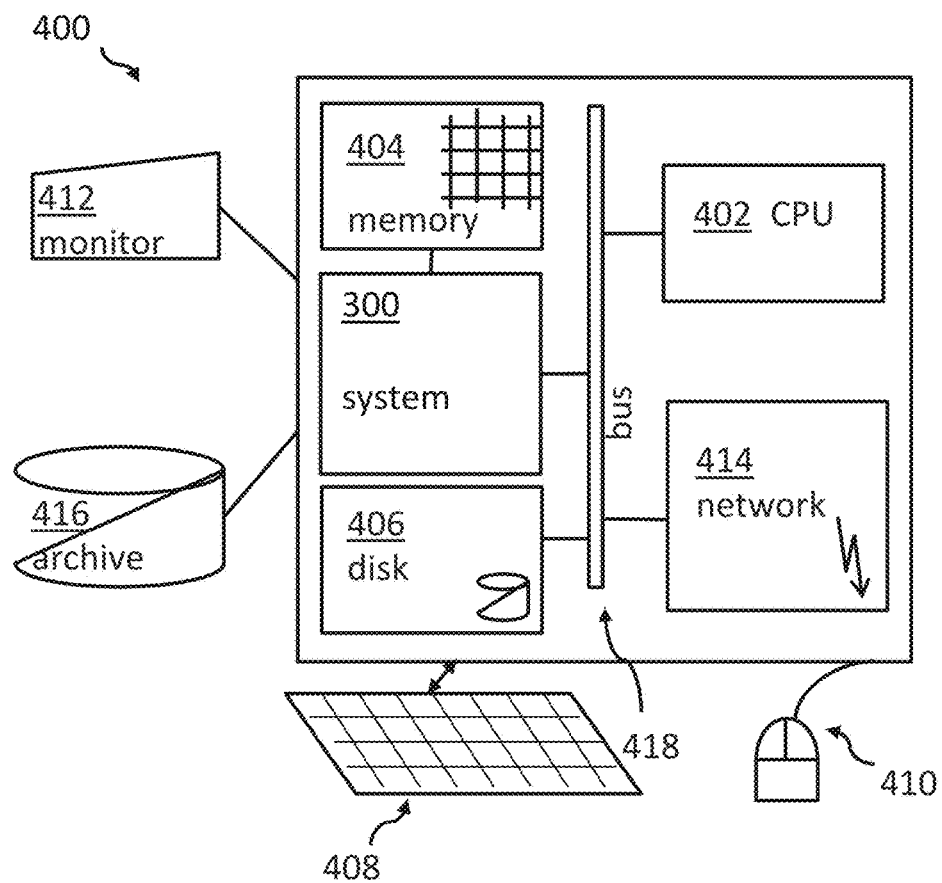
FIG. 4 depicts a computer system used to implement a method for dynamically modifying rules in a firewall infrastructure for an application code, in accordance with embodiments of the present invention.

Embodiments of the invention may be implemented together with virtually any type of computer, regardless of the platform being suitable for storing and/or executing program code. For example, FIG. 4 depicts a computer system 400 used to implement a method for dynamically modifying rules in a firewall infrastructure for an application code, in accordance with embodiments of the present invention. The computer system 400 may include one or more processor(s) 402 with one or more cores per processor, associated memory elements 404, an internal storage device 406 (details see below), and numerous other elements and functionalities, typical of today's computers (not shown). The memory elements 404 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 416 for an execution. Elements inside the computer system 400 may be linked together by means of a bus system 418 with corresponding adapters. The computer system 400 may be used as firewall server (compare areas 208 for FIG. 2) comprising the border control agent 220 and/or the firewall 222, or a system of area 206 of FIG. 2 comprising the requestor module 210. Additionally, the computer system 400 may be used in the area 202 as a deployer system. If implemented in hardware, the firewall 222 and/or the border control agent 220 or the requestor module 210 may be attached to the system bus 418.

The computer system 400 may also include input means such as a keyboard 408, a pointing device such as a mouse 410, and/or a microphone (not shown). Alternatively, the computer system 400 may be equipped with a touch sensitive screen as main input device. Furthermore, the computer system 400, may include output means such as a monitor or screen 412 [e.g., a liquid crystal display (LCD), a plasma display, a light emitting diode display (LED), or cathode ray tube (CRT) monitor]. The computer system 400 may be connected to a network [e.g., a local area network (LAN), a wide area network (WAN)], such as the Internet or any other similar type of network, including wireless networks via a network interface connection 414. This may allow a coupling to other computer systems, or a storage network, or a tape drive. Those, skilled in the art will appreciate that many different types of computer systems exist, and the aforementioned input and output means may take other forms. Generally speaking, the computer system 400 may include at least the minimal processing, input and/or output means, necessary to practice embodiments of the invention.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or another devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for dynamically modifying rules in a firewall infrastructure, said method comprising:
   receiving, by one or more processors, a signed passport comprising a hash value that includes a heart-beat time-out interval and a firewall rule, said one or more processors being hardware processors;

encrypting, by the one or more processors, the signed passport based on a public key certificate registered with a trusted signer;

generating, by the one or more processors, a trigger signal within the heart-beat time-out interval;

transmitting, by the one or more processors, the signed passport and the trigger signal within the heart-beat time-out interval to a border control agent of a firewall in the firewall infrastructure;

in response to receiving, by the one or more processors from the border control agent, a continuous confirmation of the firewall rule within a time interval shorter than the heart-beat time-out interval, modifying, by the one or more processors, the firewall according to the firewall rule;

in response to determining, by the one or more processors, that the trigger signal was not received by the border control agent within the heart-beat time-out interval, resetting, by the one or more processors, the firewall rule.

2. The method of claim 1, said receiving comprising receiving an application code, said signed passport further comprising a first application hash value, said method further comprising:

authenticating, by said one or more processors, the received passport;

hashing, by said one or more processors, the received application code, resulting in a second application hash value; and validating, by the one or more processors, the received first application hash value and the second application hash value as being equal, wherein said transmitting the signed passport and the trigger signal to the border control agent is in response to said authenticating and said validating.

3. The method of claim 2, said method further comprising:

communicating, by the one or more processors with the application code, through the modified firewall.

4. The method of claim 1, said method further comprising:

in response to a period of inactivity, closing, by the one or more processors, the firewall.

5. The method of claim 1, said receiving the signed passport comprising receiving the signed passport during a first time period at a requestor module on a server, said method further comprising:

identifying, by the one or more processors during a second time period, the passport as unsigned; and in response to a determination, by the or more processors, of an unsecured communication channel between the requestor module and the border control agent:

identifying, by the one or more processors, a signing of the unsigned passport by the requestor module;

encrypting, by the one or more processors, the signed passport with a public key of the border control agent; and transmitting, by the one or more processors, the encrypted passport through the unsecured communication channel.

6. The method of claim 1, wherein said encrypting comprising utilizing an asymmetrical encryption method.

7. A computer program product, comprising one or more computer readable hardware storage devices having computer readable program code stored therein, said program code containing instructions executable by one or more processors to implement a method for dynamically modifying rules in a firewall infrastructure, said method comprising:

receiving, by the one or more processors, a signed passport comprising a hash value that includes a heart-beat time-out interval and a firewall rule, said one or more processors being hardware processors;

encrypting, by the one or more processors, the signed passport based on a public key certificate registered with a trusted signer;

generating, by the one or more processors, a trigger signal within the heart-beat time-out interval;

transmitting, by the one or more processors, the signed passport and the trigger signal within the heart-beat time-out interval to a border control agent of a firewall in the firewall infrastructure;

in response to receiving, by the one or more processors from the border control agent, a continuous confirmation of the firewall rule within a time interval shorter than the heart-beat time-out interval, modifying, by the one or more processors, the firewall according to the firewall rule;

in response to determining, by the one or more processors, that the trigger signal was not received by the border control agent within the heart-beat time-out interval, resetting, by the one or more processors, the firewall.

8. The computer program product of claim 7, said receiving comprising receiving an application code, said signed passport further comprising a first application hash value, said method further comprising:

authenticating, by said one or more processors, the received passport;

hashing, by said one or more processors, the received application code, resulting in a second application hash value; and validating, by the one or more processors, the received first application hash value and the second application hash value as being equal, wherein said transmitting the signed passport and the trigger signal to the border control agent is in response to said authenticating and said validating.

9. The computer program product of claim 8, said method further comprising:

communicating, by the one or more processors with the application code, through the modified firewall.

10. The computer program product of claim 7, said method further comprising:

in response to a period of inactivity, closing, by the one or more processors, the firewall.

11. The computer program product of claim 7, said receiving the signed passport comprising receiving the signed passport during a first time period at a requestor module on a server, said method further comprising:

identifying, by the one or more processors during a second time period, the passport as unsigned; and in response to a determination, by the or more processors, of an unsecured communication channel between the requestor module and the border control agent:

identifying, by the one or more processors, a signing of the unsigned passport by the requestor module;

encrypting, by the one or more processors, the signed passport with a public key of the border control agent; and transmitting, by the one or more processors, the encrypted passport through the unsecured communication channel.

12. The computer program product of claim 7, wherein said encrypting comprising utilizating an asymmetrical encryption method.

13. A computer system, comprising one or more processors, one or more memories, and one or more computer readable hardware storage devices, said one or more storage device containing program code executable by the one or more processors via the one or more memories to implement a method for dynamically modifying rules in a firewall infrastructure, said method comprising:
receiving, by the one or more processors, a signed passport comprising a hash value that includes a heart-beat time-out interval and a firewall rule, said one or more processors being hardware processors;
encrypting, by the one or more processors, the signed passport based on a public key certificate registered with a trusted signer;
generating, by the one or more processors, a trigger signal within the heart-beat time-out interval;
transmitting, by the one or more processors, the signed passport and the trigger signal within the heart-beat time-out interval to a border control agent of a firewall in the firewall infrastructure;
in response to receiving, by the one or more processors from the border control agent, a continuous confirmation of the firewall rule within a time interval shorter than the heart-beat time-out interval, modifying, by the one or more processors, the firewall according to the firewall rule;
in response to determining, by the one or more processors, that the trigger signal was not received by the border control agent within the heart-beat time-out interval, resetting, by the one or more processors, the firewall.

14. The computer system of claim 13, said receiving comprising receiving an application code, said signed passport further comprising a first application hash value, said method further comprising:
authenticating, by said one or more processors, the received passport;
hashing, by said one or more processors, the received application code, resulting in a second application hash value; and
validating, by the one or more processors, the received first application hash value and the second application hash value as being equal,
wherein said transmitting the signed passport and the trigger signal to the border control agent is in response to said authenticating and said validating.

15. The computer system of claim 14, said method further comprising:
communicating, by the one or more processors with the application code, through the modified firewall.

16. The computer system of claim 13, said method further comprising:
in response to a period of inactivity, closing, by the one or more processors, the firewall.

17. The computer system of claim 13, said receiving the signed passport comprising receiving the signed passport during a first time period at a requestor module on a server, said method further comprising:
identifying, by the one or more processors during a second time period, the passport as unsigned; and
in response to a determination, by the or more processors, of an unsecured communication channel between the requestor module and the border control agent:
identifying, by the one or more processors, a signing of the unsigned passport by the requestor module;
encrypting, by the one or more processors, the signed passport with a public key of the border control agent; and
transmitting, by the one or more processors, the encrypted passport through the unsecured communication channel.

* * * * *